Nov. 8, 1949
J. L. PORTER
2,487,474
PREPARATION OF MAGNESIUM NITRIDE
Filed Jan. 2, 1945
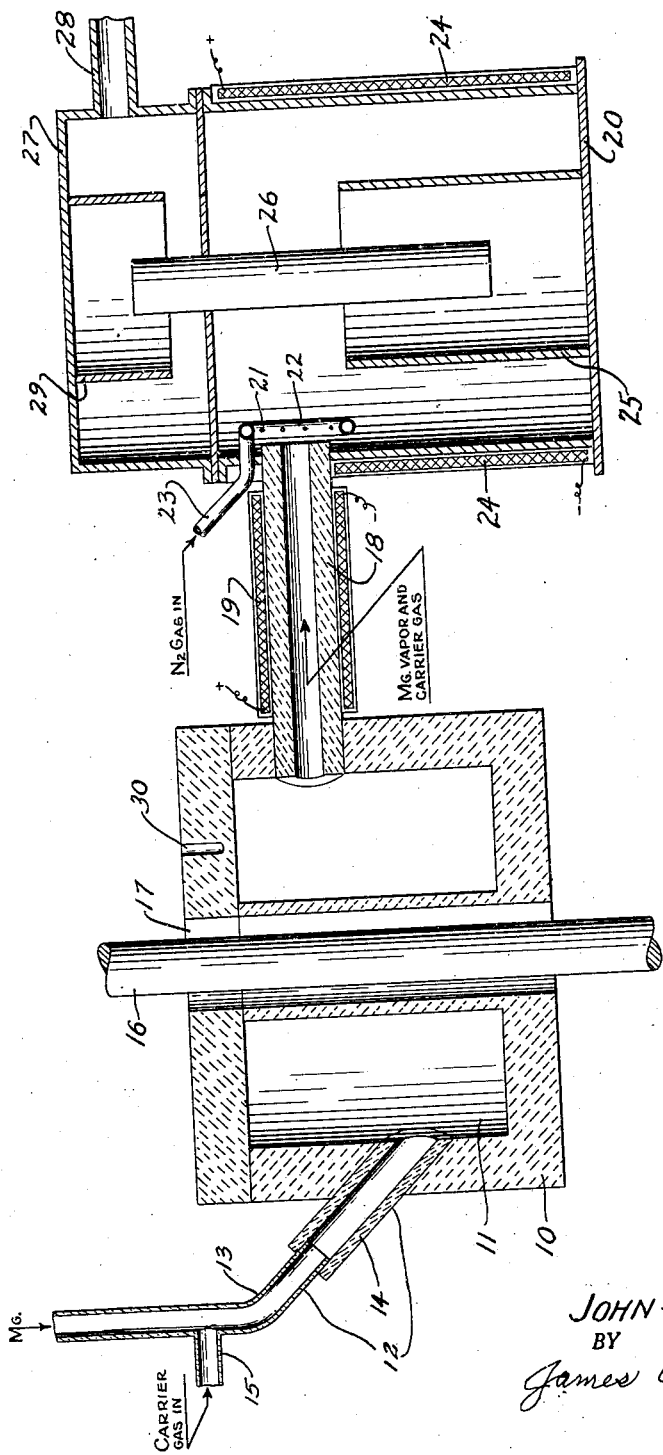
INVENTOR.
JOHN L PORTER
BY
James C. Toomey
agt.

Patented Nov. 8, 1949

2,487,474

UNITED STATES PATENT OFFICE 2,487,474

PREPARATION OF MAGNESIUM NITRIDE

John L. Porter, Palo Alto, Calif., assignor to The Permanente Metals Corporation, Oakland, Calif., a corporation of Delaware Application January 2, 1945, Serial No. 571,074

7 Claims. (Cl. 23—191)

1

This invention relates to processes for preparing magnesium nitride, and particularly to processes wherein magnesium is reacted with nitrogen or a nitrogen-yielding gas.

Magnesium nitride reacts very readily with water to form ammonia and it is evident therefore that the compound is a useful dehydrating agent in inorganic reactions, and is also useful in organic syntheses. It is also useful in compounding synthetic rubber. A number of methods for preparing the magnesium nitride compound have been reported in the literature but extensive practical preparation of the product has not been known. The methods reported by various investigators have included heating finely divided metal in a stream of nitrogen, in a restricted amount of air (thereby forming the oxide until available oxygen has been used up, and then forming nitride), decomposition of magnesium ferrocyanide with heat, reaction of the finely divided metal with ammonia and reduction of KCN or KCNS by magnesium. It has been found that certain disadvantages attend each of these methods. For instance, in burning the metal in a restricted amount of air an undesirable contamination with magnesium oxide is obtained and, the nitride being very reactive, its purification is impracticable. Also when finely divided metal heretofore available has been reacted by passing nitrogen or ammonia gas thereover at temperatures of 67° C. to 900° C., as has been described in the literature, it is found that a refractory mixture or solution of the nitride in the metallic magnesium is obtained which is usually a hard, dense, black mass. Such a material is not usable in the same manner as the pure nitride.

It has also been proposed to react magnesium with nitrogen or ammonia at relatively lower temperatures, that is, at from about 400° to about 600° C. but this has proved too slow to be practicable in operating with the magnesium powders or turnings available in the prior art. In this reaction, which takes place between a gas and a solid, the direct nitriding of relatively large crystals or masses of the metal does not proceed to completion, perhaps because the magnesium nitride forms a hard coating over the surface of the metal, effectively protecting the inner portions from further attack by the nitriding gas.

It has further been proposed to prepare aluminum or magnesium nitride by reducing magnesium oxide with a carbonaceous reducing agent at, for example, 1800° C. to 2200° C., withdrawing the gaseous products of reaction (magnesium or

2 aluminum vapor and CO) to a separate reaction zone, and there bringing these products into contact with nitrogen or a nitrogen-carrying gas, and cooling with formation of nitride. However, magnesium vapor under these conditions preferentially reacts with the oxygen of the CO and very small quantities of nitride are formed. The reactions involved in this system tend to produce magnesium oxide as long as sufficient oxygen is available to satisfy the magnesium, although, of course, some nitride may be formed.

According to this invention it has now been found that magnesium nitride can be prepared by bringing magnesium vapor into contact with a nitrogen-yielding gas in the absence of a substantial proportion of an oxygen-yielding gas. The nitrogen-yielding gas suitable in this reaction is nitrogen or ammonia, for example. Preferably, magnesium vapor at a temperature of from about 900° C. to about 1120° C. is reacted with nitrogen gas which has been pre-heated to a temperature of at least about 400° C. or with ammonia gas pre-heated to at least about 300° C. In some cases it may be desirable to super-heat the magnesium vapors above 1120° C. and in these cases the temperature of the nitrogen or $NH_3$ may be somewhat lower than the preferred values shown, but in no case must this temperature be low enough to cause deposition of masses of solid metal without reaction to nitride.

The magnesium vapor is advantageously obtained by heating magnesium turnings, powdered magnesium, magnesium crystals, the crude condensate or dust recovered by shock-chilling the vaporous products of reaction issuing from the reduction zone of the carbothermic process for making magnesium metal, or the like in a heating zone, the magnesium vapor being conducted thence to a reaction zone where it is brought into contact with the nitrogen-yielding gas. The magnesium starting material may also contain contaminants, as in the case of the carbothermic condensate, for example, which are not volatile under the conditions of operation.

Flow of magnesium vapor into the reaction zone is maintained at a rate sufficient to prevent deposition of solid material in the connecting conduits and to prevent the reaction from traveling back along the vapor stream. Sufficient flow may be maintained by developing magnesium vapor alone in the vaporization zone, or in a variation the flow of magnesium vapor can be supplemented with a carrier gas inert to magnesium and the reacting gas under the conditions of operation.

The carrier gas is suitably hydrogen although any other inert gas or mixture of gases, such as the noble gases, helium, argon etc. can also be used. By the introduction of a carrier gas, considerable amounts of magnesium vapor are removed from the heating zone even before the boiling point of magnesium is reached. The flow of carrier gas varies with the temperature and vaporizing conditions of the furnace or heating zone. For example, when the vapor pressure of the magnesium is low, that is, at lower temperatures of the heating zone, more carrier gas is added but the amount can be decreased as the amount of magnesium vapor increases. However, it is sometimes advantageous to maintain a flow of carrier gas at higher magnesium vapor pressures also, inasmuch as the carrier gas helps to maintain a desired constant rate of flow into the reaction zone. The flow should not be so fast, of course, that magnesium passes unreacted out of the reaction zone.

One of the important advantages of the process of this invention is that the reaction between the magnesium and the reacting gas is enabled to proceed to substantial completion. By the methods known to the art it has not been possible to produce magnesium nitride of controlled degree of purity. In those methods where solid metal, even divided as finely as possible by the comminuting processes available heretofore, has been reacted with a nitrogen-yielding gas the surface of the magnesium particle has reacted and thereby become coated with a hard and impervious layer of nitride and, as a result, a considerable amount of the metallic element has remained unreacted. In the method where a mixture of Mg vapor and CO is brought into contact with nitrogen or a nitrogen-carrying gas, the magnesium vapor has preferentially reacted with the carbon monoxide to give magnesium oxide and the yield of nitride has been negligible if perceptible at all. These disadvantages are overcome by the process of the present invention wherein magnesium is vaporized, conducted to a reaction zone and there brought into contact with a nitrogen-yielding gas. In the absence of a substantial proportion of an oxygen-yielding gas, nitride is formed predominantly. That is to say, when the magnesium vapor is brought into contact with a nitrogen-yielding gas in the presence of a proportion of available oxygen, magnesium oxide is formed until the oxygen supply is exhausted. The formation of nitride then begins. When it is desired to prepare highly pure nitride, the presence of available oxygen in the reaction zone is undesirable, but where a highly pure product is not required the presence of a small amount of oxygen is not objectionable. By using gases which are free of oxygen and moisture a substantially pure nitride is prepared.

The drawing illustrates an apparatus which is suitable for one method of carrying out the process of this invention. In the drawing, 10 is the heating furnace which is preferably made of graphite blocks and contains annular heating space 11 into which magnesium, as in the form of magnesium crystals, is fed through a tube 12, suitably made of a glass section 13 and graphite section 14. Carrier gas, in this case hydrogen, is fed in at 15 and acts to maintain a positive pressure along the path of travel of the crystals, preventing magnesium vapor from backing up and depositing in this line. If desired, the graphite inlet tube can also be heated, as by an electrical resistor coil. The graphite furnace 10 is heated by a globar element 16 which extends through a central conduit 17 which is sealed off from the heating zone.

The vapors from heating zone 11 are impelled with the aid of the carrier gas through tube 18 leading from the furnace to the reaction chamber 20. Tube 18 is also preferably of graphite and is suitably heated by a resistor element 19 also. Gas ring 22 surrounds the area adjacent to entrance of tube 18 into reaction chamber 20 and introduces nitrogen, or ammonia, gas into intimate contact with the magnesium vapor stream. Inlet tube 23 for this gas, leading to ring 22, is suitably heated by an electrical resistor, to raise the temperature of the incoming gas to at least 300° to 400° C. and the temperature may preferably be raised to about 700° C. Ring 22 has apertures 21 on its inner face adapted to cause nitrogen, or ammonia, gas to impinge directly on the magnesium vapor stream as it issues from tube 18.

Reaction chamber 20 can be made of steel or other suitable metal and is suitably heated to the desired reaction temperature for proper initiation of the reaction by means of resistors 24. It contains baffle wall 25 about outlet tube 26 which conducts the gases, comprising for purposes of illustration hydrogen and excess nitrogen or excess ammonia, to removable top portion 27 whence the gases issue through tube 28. The issuing gas mixture may be separated and its component elements re-used, or it may be burned off. Within cap 27 is another baffle device 29, which acts to take out any solid products which may have been carried over from reaction chamber 20. The solid product of reaction is removed from chamber 20, and from cap assembly 27.

In an example of the method of carrying out this invention, 3 grams of magnesium crystals per minute are fed to heating furnace 10 and at the same time 3 liters of hydrogen per minute are introduced at 15. Furnace 10 is heated by globar element 16 to 1110° C. as measured by a thermocouple in well 30. Magnesium vapors flow by way of tube 18 to reaction chamber 20, which is heated to about 800° C. to initiate the reaction, and as the vapors enter thereinto they are intimately mixed with a stream of nitrogen, preheated to 600° C., and entering through apertures in ring 22, the nitrogen being introduced at a rate of 4 liters per minute. After reaction begins and the development of heat of reaction is evidenced by increase in temperature, the external heating of reaction chamber 20 is discontinued, and the temperature is maintained close to 700° C. and not exceeding 900° C. The magnesium nitride formed deposits as a fairly hard coating on the walls and baffles of the reaction chamber. It is removed by scraping and is a yellow granular solid, containing 95% magnesium nitride, the remainder being magnesium oxide and magnesium hydroxide. Advantageously in this example, the nitrogen gas is also purified by passing it over heated copper turnings prior to conducting it to the reaction chamber. Excess gases pass off through cap assembly 27 which is at about 300° C., a further quantity of the nitride being recovered therein.

In another example, 2 grams of magnesium crystals per minute are added to the furnace 10 and hydrogen introduced at 15 at the rate of 3 liters per minute. The furnace is heated to 1090° C. and the mixture of magnesium vapor and hydrogen passes to reaction chamber 20 as in the example above. The reaction chamber is heated to 700° C. Ammonia gas, preheated to 600° C., is introduced through ring 22 at the rate of 3 liters per minute. It reacts with the magnesium vapor to give a magnesium nitride which is a bright yellow powder and is very active.

If desired, a mixture of ammonia and nitrogen can be reacted with the magnesium vapor. Other carrier gases, such as helium, argon or the like can be used instead of hydrogen. Where large volumes of vapors are treated and the heat of reaction tends to cause excessive rise of temperature in the reaction zone, the reaction zone is suitably cooled, as externally with cool gases or the like.

It is advantageous, in order to further the reaction and to increase the yield to the maximum, to maintain the reaction chamber at a temperature at which the magnesium and nitrogen-yielding gas have time to react, and at which magnesium metal evidently does not condense to a solid before it has reacted. It has been found that the reaction zone is preferably maintained at a temperature of from about 400° C. to about 1000° C. when the reacting gas is ammonia, and preferably from about 600° C. to about 1000° C. when the reacting gas is nitrogen. Similarly, the temperature of the incoming reactant gas, e. g. nitrogen or ammonia, is preferably just high enough to prevent condensation of magnesium to the solid metal before reaction occurs. Thus when the reaction zone is at a relatively higher temperature and the flow of magnesium vapor is relatively slightly slower, the temperature of the incoming reacting gas may be relatively less.

In the appended claims, the term "oxygen-providing" gas is intended to mean a gas containing oxygen available for reaction with the magnesium vapor, including gases containing free oxygen for example, air, and gases containing combined oxygen, for example, carbon monoxide.

What is claimed is:

1. Process for making magnesium nitride which comprises heating and vaporizing magnesium metal, conducting said vaporized magnesium in the presence of an inert carrier gas into a reaction zone and there intimately admixing it with a gas at a temperature of at least 300° C., chosen from the group consisting of nitrogen and ammonia, and collecting the substantially pure magnesium nitride produced, the process being conducted in the absence of an oxygen-yielding gas.

2. Process for making magnesium nitride which comprises heating and vaporizing magnesium metal in the presence of an inert gas, continuously conducting said vaporized magnesium and admixed inert gas to a reaction zone, said mixed vapors having a temperature of from about 900° C. to about 1120° C., intimately admixing said mixed vapors in said reaction zone with a continuous flow of nitrogen heated to a temperature of at least about 400° C., and collecting the substantially pure magnesium nitride produced, said process being conducted in the absence of an oxygen-yielding gas.

3. Process as in claim 2 wherein the inert gas is hydrogen.

4. Process for making magnesium nitride which comprises heating and vaporizing magnesium metal in the presence of an inert gas, continuously conducting said vaporized magnesium and admixed inert gas to a reaction zone, said mixed vapors having a temperature of from about 900° C. to about 1120° C., intimately mixing said mixed vapors in said reaction zone with a continuous flow of ammonia heated to at least about 300° C., and collecting the substantially pure magnesium nitride produced, said process being conducted in the absence of an oxygen-yielding gas.

5. Process as in claim 4 wherein the inert gas is hydrogen.

6. In a process for making magnesium nitride the steps which comprise heating and vaporizing magnesium, conducting vaporized magnesium in the presence of an inert carrier gas into a reaction zone maintained at a temperature of from about 600° C. to about 1000° C., and there intimately admixing it with a flow of nitrogen at a temperature of at least 400° C., said process being conducted in the absence of an oxygen-yielding gas.

7. In a process for making magnesium nitride the steps which comprise heating and vaporizing magnesium, conducting said vaporized magnesium in the presence of an inert carrier gas into a reaction zone maintained at a temperature of from about 600° C. to about 1000° C., and there intimately admixing it with a flow of ammonia at a temperature of at least 300° C., said process being conducted in the absence of an oxygen-yielding gas.

JOHN L. PORTER.

REFERENCES CITED

The following references are of record in the file of this patent:

UNITED STATES PATENTS

| Number | Name | Date |
| --- | --- | --- |
| 1,803,720 | Miner | May 5, 1931 |

OTHER REFERENCES

Mellor, "Inorganic and Theoretical Chemistry," Longman's, London, vol. VIII (1928), pp. 104, 105.

"Chemical Engineer's Handbook," 2nd ed., McGraw-Hill Book Co., New York (1941), page 339.